Nov. 18, 1941.    R. W. LEWIS    2,263,509

LENS AND METHOD OF PRODUCING IT

Filed March 21, 1939

Inventor
Reginald Walker Lewis
By Vernon E. Hodges
H. Hamlin Hodges Attorneys

Patented Nov. 18, 1941

2,263,509

UNITED STATES PATENT OFFICE 2,263,509

LENS AND METHOD OF PRODUCING IT

Reginald Walker Lewis, Williamsport, Pa.

Application March 21, 1939, Serial No. 263,236

2 Claims. (Cl. 88—57)

This invention relates to an improvement in lenses and the method of producing them.

Figure 1:
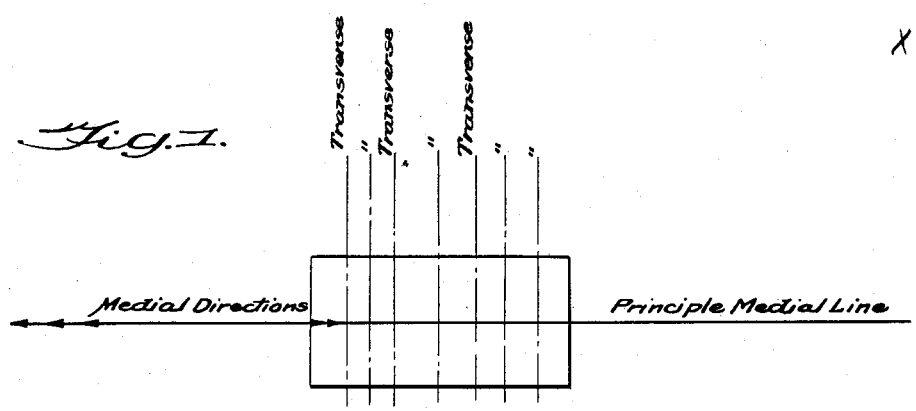
Figure 1 is a plan view of a lens.

The lenses illustrated have one surface whereon are ground and polished a series of progressively varying curves. These curves are ground transversely along, and at right-angles to, the principal medial line.

These curves do not vary proportionally, but are selected and arranged to accomplish a definite result. This result is to cause parallel incident light, striking the first principal plane at right-angles, to be first refracted, and then projected to a second plane, whereupon it will have an equal increase of dioptral power over equal gradations in a medial direction.

This second plane is an imaginary plane, and it is parallel to, and coincidental with, the first surface of the second lens. This second plane is adapted to be used at a predetermined distance from the first lens, and is parallel to planes in which the two lenses move while functioning.

In order to know just what curves are needed to produce the above-mentioned lens-surface, we must start with the dioptral power sequence chosen for the second plane. Tentatively, we might calculate for each one-hundredth (100th) diopter change. First, we comput for the airgap or clearance between the two lenses. This gives us the powers required at the second surface of the first lens. Knowing these powers, and knowing the adopted curvature of this second surface, we then use the standard formula to determine the proper curves for the first surface.

As these lenses are adapted to be used in pairs, the second lens must be corrected likewise for glass-thickness and index of refraction.

Having found the precise transverse-curve-sequence to be used for the variable-sphere type lens, we grind these different transverse curves along a medial line which equals in curvature each and every such transverse curve wherever they intersect at right-angles, thus developing a specifically constructed variable-sphere.

The variable-cylinder type lenses are ground and used in a like manner, and differ only in that all curves in medial directions are constant and approximately equal, and are ground while held in a wheel or wheel-segment which revolves parallel to the medial plane on its own axis at a constant slow speed. The wheel, while so revolving, is also moved in another direction for varying the radii of the transverse curves, and this direction is at right-angles to the machine base, or vertically. This variable-cylinder type has a constant thickness along its principal medial line.

As the particular lens-elements here shown are of opposite signs, I shall explain briefly the method of grinding the plus element. The minus element is ground and polished in a similar but reversed manner. The variable surface of this lens is produced by a method of causing a grinding element to move back and forth transversely across the lens, while the lens is being gradually moved in a direction parallel to the principal medial line. During this grinding operation, the grinding element also moves transversely through progressively varying arcs, the radii of which are suitably governed by identical cams, which constantly move both lens and grinding element away from a common plane in equal amounts, at and in the same time, thus developing an unbroken continuity of lens-surface. The variable surface of the lens is ground and polished by an abrasive element which has a spherical or flat surface, and which revolves on its own axis.

This revolving element is oscillated back and forth across the lens transversely through varying arcs which constantly change the radii of the progressing curves. At the same time, the lens itself is moved in a plane parallel to the medial plane, and is so timed that equal increases of dioptral power along the second plane, indicated by certain curves along the variable surface, will be ground at exactly the proper positions, and as all sections of the lens-surface have equal intersecting curves wherever these curves intersect at right-angles, the resultant surface will, therefore, be a variable-sphere. In addition to the above-mentioned movements of the grinding element, this element also moves simultaneously back and forth in medial directions in a constant arc which, relative to the transversely oscillating arms, coincides with their common principal medial plane. The radius of this constant arc is exactly equal to the radius of curvature of the grinding surface; and that radius is approximately equal to, but not less than that of, the greatest plus curvature ground. Also, the axis of the revolving grinding-element is always at right angles to this latter mentioned constant arc. We thus employ a novel method of grinding which might be termed a "point-line-lap" method. The purpose of the last motion, however, is to cause the grinding element to wear equally at all points on its surface, and also to grind and polish the variable-surface with greater precision and perfection.

Figure 2:
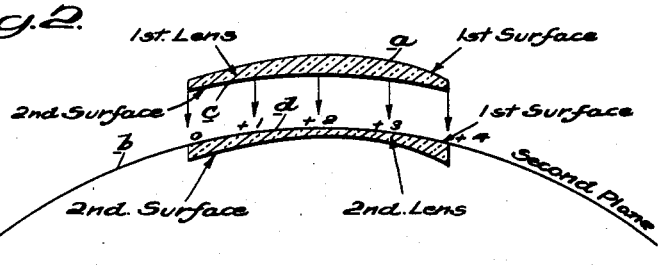
Figure 2 is a sectional view through two lenses designated "first lens" and "second lens"; and, Figure 3 is illustrative of an application of these lenses, showing them held in two diskbands which revolve in opposite directions.

In Figure 2, two lenses are shown in section through the principal medial line which coincides with their optical centers. These lenses are so ground and polished that parallel incident light striking the first surface (a) at right angles, will be refracted, and then projected to the second plane (b), whereupon it will have a variable power which increases equally over equal gradations in one direction. This second plane (b) is at a predetermined distance from, and parallel to, the second surface (c) of the first lens. It is parallel to, and coincidental with, the first surface (d) of the second lens, and is also parallel to the planes in which the lenses move while functioning.

By way of illustration, I have tentatively adopted the exact equidistant powers of 0.00D., plus 1.00D., plus 2.00D., plus 3.00D. and plus 4.00D. for the second plane, and exactly minus ten diopter sphere (−10.00D.S.) for the adopted curvature of the second surface (c) of the first lens. Therefore, I shall get, approximately, plus ten to fourteen diopters for the first surface $a$ of the first lens, and, approximately, minus ten to minus fourteen diopters for the second surface of the second lens, and if these lenses, as shown, are fully overlapped, then parallel incident light striking the pair at right-angles to the first surface $a$ will emerge from this pair as parallel rays.

The two described lenses illustrated in Figure 2, when properly placed and fully overlapped, will first refract parallel incident light through the first lens; then project it to the second lens; and, after being refracted by the second lens, will finally emerge as parallel light rays. But, should these lenses be separated in medial directions parallel to the second plane, parallel incident light will then emerge from the pair, having a different, but still constant, dioptral power throughout the overlapping sections.

The variable sphere is ground and polished exactly as the variable cylinder, except that all transverse curves intersect non-constant curves at right-angles, whereas the variable cylinder has all curves in medial directions constant and, approximately, equal.

The non-constant curves having the same radii of curvature as each transverse curve wherever they intersect at right angles, will cause the projected rays from the first lens to form on this lens' second plane a series of sphere dioptral-equivalents, which increase in power equally over equal gradations in a direction parallel to the principal medial line. The lenses, when used in pairs, will effect perfect and constant sphere-power or cylinder-power, respectively, wherever they overlap, but with different amounts, throughout different overlapping positions. The variable-spheres may be de-centered for a better distribution of lens-thickness. The variable-cylinders have constant thickness along their principal medial line. In pairs, the higher-powered ends of the single lenses having like signs, are placed at opposite ends of the pair, and vice versa for those with unlike signs.

I have chosen for an illustrative application of my invention a diagrammatic view of a portion of a camera, in which, by the addition of my invention, all the infinitesimal planes from infinity to any desired nearness will be automatically focused during a single exposure, thereby permitting the constant use of a full aperture for extreme sharpness of definition, while getting 100% depth, and also for the "stopping" of very fast moving objects.

Figure 3:
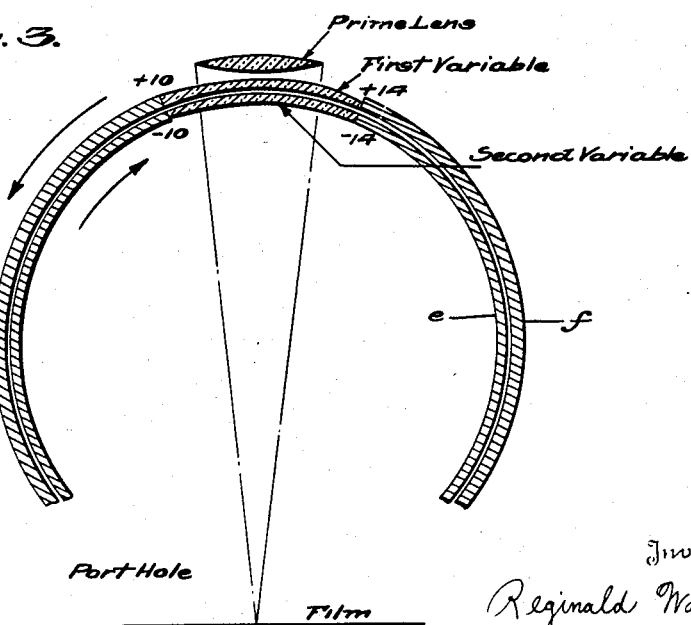

Figure 3 shows this auxiliary pair of lenses held in two disk bands (e) and (f), which latter revolve in opposite directions equally and simultaneously and are adapted to pass each other at any desired speed. In the position shown, the lenses exactly neutralize each other, and they change from that position to such separation as may be desired during a single exposure. The rays (here) pass through holes in the disk bands to reach the film.

To control the amount of lens-separation during exposure, the speeds of disks and shutter may be varied. A variable-light controller, which may be used, governed by a light-meter, will permit the use of a constant full aperture at all times.

It will be understood that these two lenses are separated in parallel planes and in equal dioptral amounts, so that their common optical center does not move at all. This separation is completed during one exposure, and will produce the required variation of foci. Because of the extremely rapid focal-change, all enlarging or contracting blurs will fail completely to register because of their corresponding extremely rapid motion during a single exposure. These lenses may be used as parts of a lens-system in cameras or optical instruments, or as a lens-system alone; or, as ophthalmic lenses when used singly; as, for example, multifocal lenses.

An important feature of this camera design is the variable spheres. These are constructed in such a way as to produce, in pairs, a perfect and constant spherical power wherever they overlap; and this constant dioptral power will increase throughout progressively when the lenses are properly separated, and equally for equal separations.

It should be noted that these lenses are not conical lenses in any respect. They are not ground on cones, and have no relation whatsoever to cones or conical surfaces, but their various radii of curvature, although progressive, are so arranged along the principal medial line that parallel incident light rays striking the first surface at right-angles; it is repeated; will be refracted, and then projected to a second imaginary plane, which is parallel to, and at a predetermined distance from, the second surface of the first lens; and where the first surface of the second lens moves parallel to, and coincidentally in this second plane. These lenses, in reality, have a series of progressively varying curves ground along, and at right-angles to, the medial line.

These curves do not progress in radii, as similar curves do on any type of cone. I do, however, grind these progressive curves in such a manner as to produce an equal increase of dioptral power over equal gradations along the above-mentioned second plane. This is done by first computing the normal radii of curvature for the given powers, and then correcting them for lens-clearance, index and glass-thickness. This is done, in part, by the following formulae, the first of which is used for the first lens, and the second for the second lens:

$$D1 = \frac{DV - D2}{1 + (DV - D2)\left(\frac{T}{1000N}\right)}$$

$$D2 = Dv - \frac{D1}{1 - D1\left(\frac{T}{1000N}\right)}$$

Where, D1 is the first surface curvature.
D2 is the second surface curvature.
Dv is the power required.
T is the thickness in M/M.
N is the index of refraction.

I claim:

1. An objective lens system of a camera including a prime lens and an auxiliary pair of lenses axially spaced apart from the prime lens, said auxiliary lenses positioned between the prime lens and its focal plane and in two spaced apart concentric disk bands adapted to revolve in opposite directions at equal speed, said auxiliary lenses having varying degrees of power from one edge to the other, whereby when the said lenses are moved in opposite directions they combine to give additional increment of power to the system for equal angles of movement thereof, and objects at varying distances from the prime lens may be focused at the focal plane of the lens system.

2. An objective lens system of a camera including a prime lens, an auxiliary pair of lenses axially spaced apart from the prime lens, said auxiliary lenses positioned between the prime lens and its focal plane, and in two spaced apart concentric disk bands adapted to revolve in opposite directions at equal speed, and apertures in said disk bands substantially diametrically opposed to the said auxiliary lenses, the said auxiliary lenses having varying degrees of power from one edge to the other, whereby when said lenses are moved in opposite directions they combine to give additional increment of power to the system for equal angles of movement thereof, and objects at varying distances from the prime lens may be focused at the focal plane of the lens system.

REGINALD WALKER LEWIS.